June 3, 1930.  F. TESSÉ  1,761,997
PNEUMATIC SUSPENSION WHEEL
Filed March 18, 1929  4 Sheets-Sheet 1
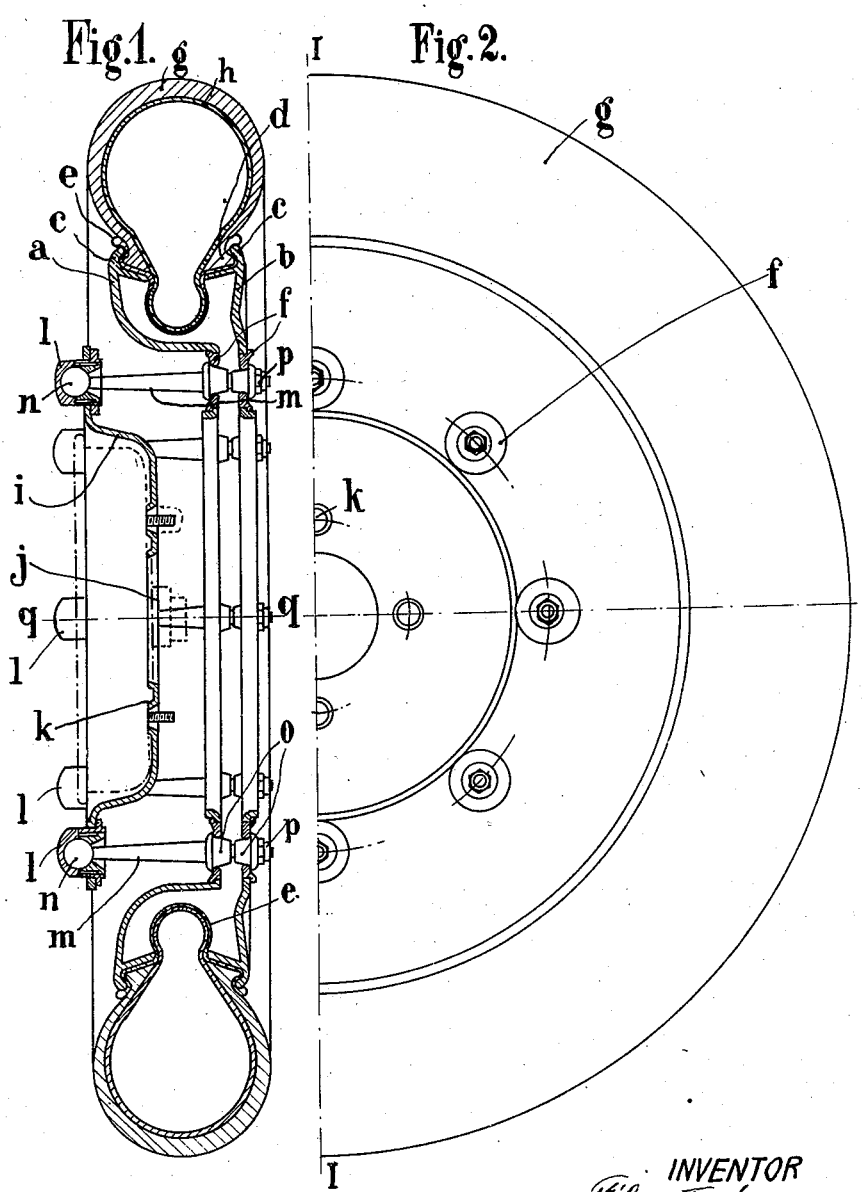
INVENTOR
Félix Tessé
BY
Andrew T. Dupont
his ATTORNEY

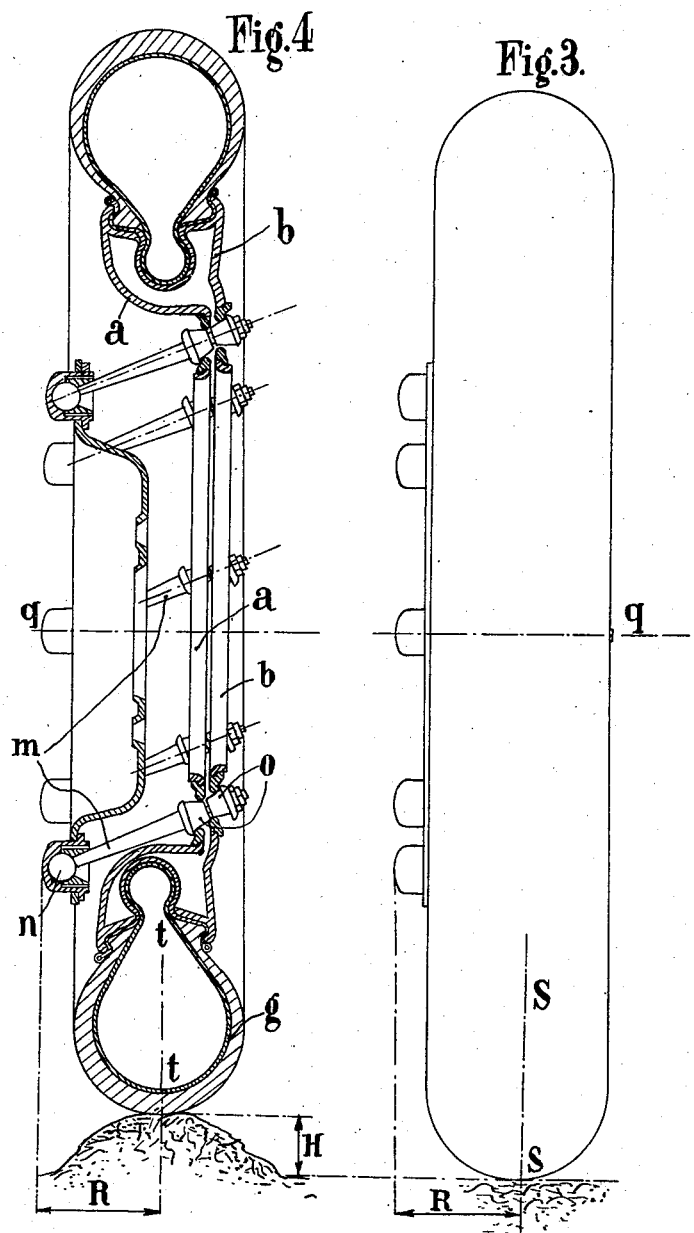

June 3, 1930.　　　　　F. TESSÉ　　　　　1,761,997
PNEUMATIC SUSPENSION WHEEL
Filed March 18, 1929　　4 Sheets-Sheet 3
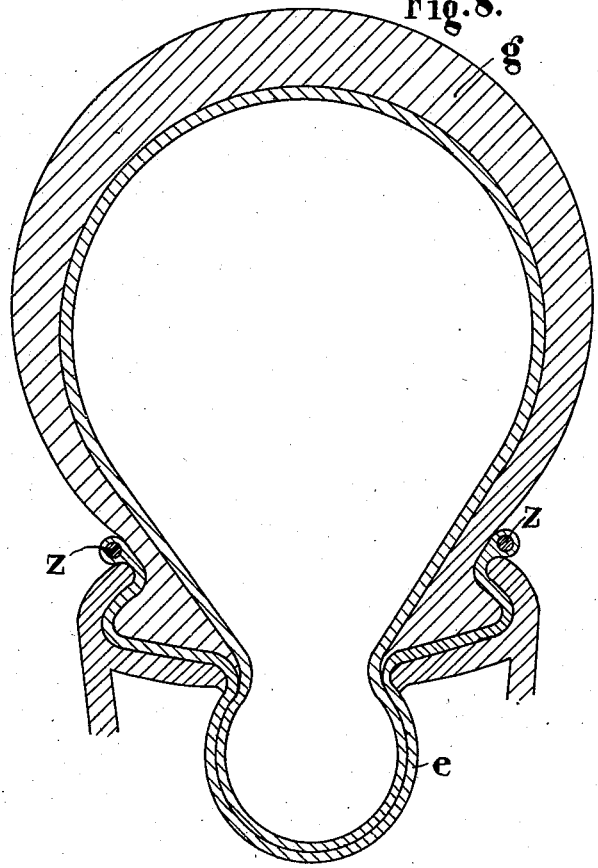
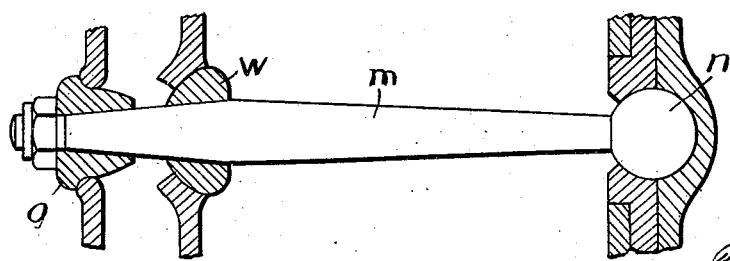

June 3, 1930.  F. TESSÉ  1,761,997
PNEUMATIC SUSPENSION WHEEL
Filed March 18, 1929  4 Sheets-Sheet 4
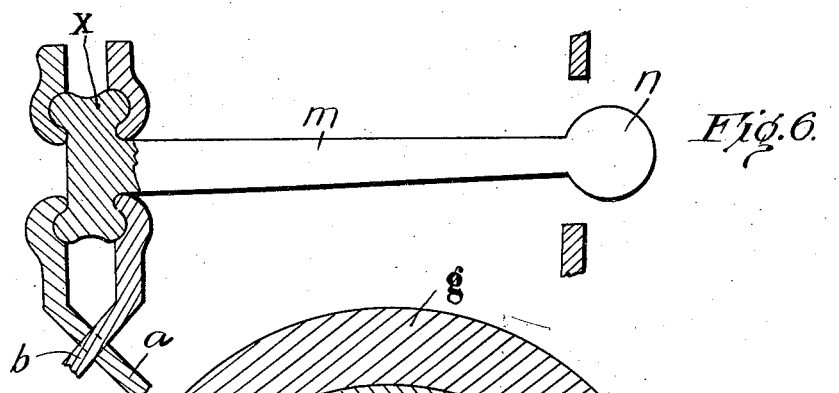
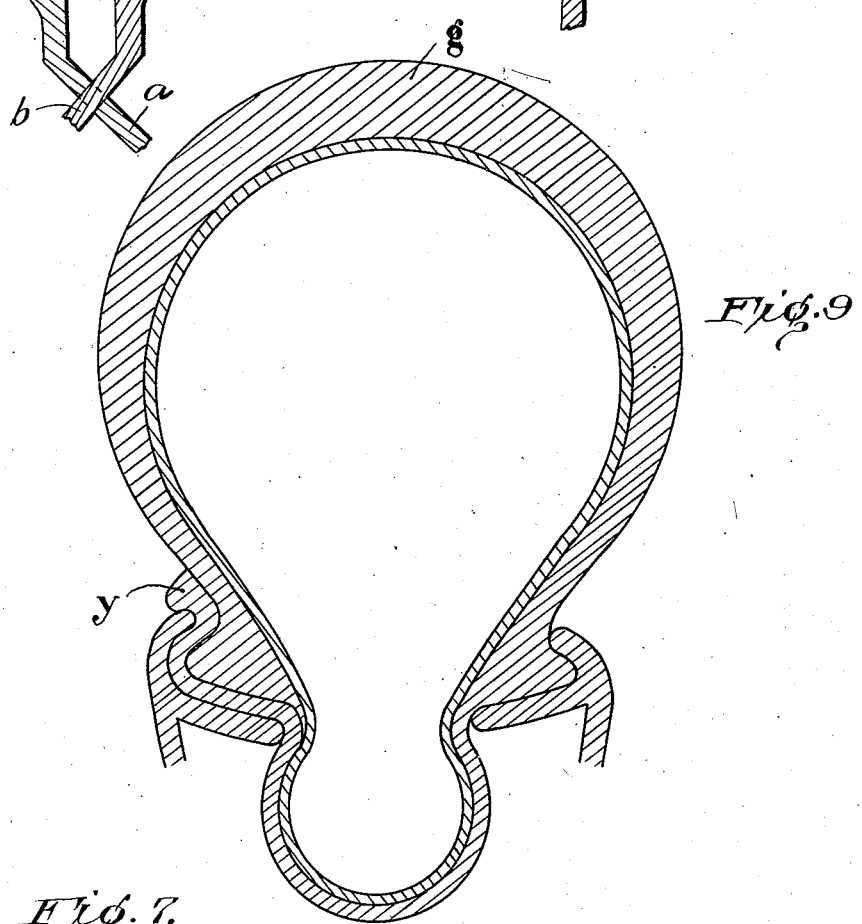
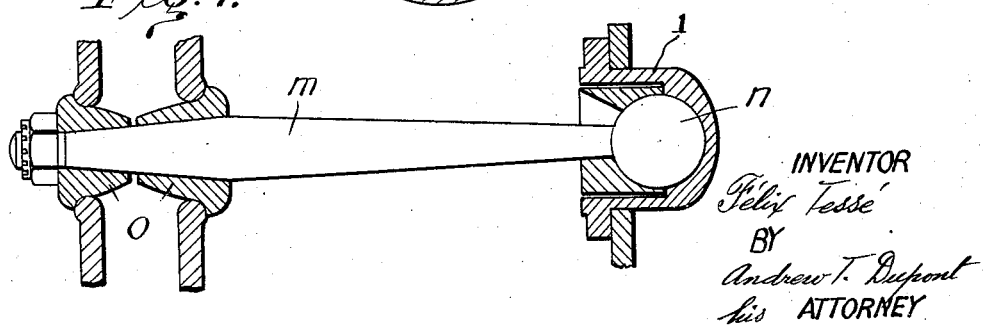
INVENTOR
Félix Tessé
BY
Andrew T. Dupont
his ATTORNEY Patented June 3, 1930

1,761,997

UNITED STATES PATENT OFFICE

FÉLIX TESSÉ, OF LA COURNEUVE, FRANCE

PNEUMATIC SUSPENSION WHEEL

Application filed March 18, 1929, Serial No. 348,044, and in Luxemburg March 31, 1928.

This invention has for its object a wholly pneumatic suspension wheel. It aims at doing completely away with springs in so-called elastic wheels and incidentally at rendering said wheels such that they may:—

(a) On one hand take care of the suspension of the vehicle equipped therewith, without regard to whether they are employed alone or together with ordinary suspension springs and, in either case, practically avoid both the rebound effect and the abnormal wear of the tire which results from skidding on the unevennesses of the road;

(b) On the other hand, allow the provision of such method of manufacture as will make it possible to reduce to a minimum the weight of the unsuspended portion of said wheels.

This invention consists principally in providing the wheels of the kind described with such a device as will allow the pressure in the pneumatic tire to be made use of to obtain the suspension of the vehicle equipped with said pneumatic tire wheel.

The above device comprises essentially:—

1. Two side plates formed at the periphery thereof with a groove adapted to receive each flanged or wire-stiffened portion of the tire;

2. An internal flexible covering adapted to resist the air pressure in the tire, which covering engages the above mentioned side plates;

3. A side plate rigid with the wheel hub;

4. A single or multiple attaching means by which the side plate which is rigid with the wheel hub is connected to both wheel side plates.

The invention aims particularly at a definite application (to automobile vehicles) and certain embodiments of each element of the above device as will be described in the following.

The invention will be better understood with reference to the complementary description and appended drawings both of which are mainly given for explanatory purposes.

Figure 1 of said drawings illustrates a cross-section on line I—I of Figure 2.

Figure 2 shows a fragmentary elevational view of a pneumatic tire wheel constructed according to the invention.

Figures 3 and 4 are elevational views of a centered wheel (Fig. 3) and a cross sectional view of a wheel in the position of running over an obstacle (Fig. 4) respectively.

Figures 5, 6 and 7 are cross sectional views of the attaching means by which all three side plates are connected together.

Figures 8 and 9 are cross sectional views showing two different kinds of a flexible and deformable covering adapted to resist the air pressure of the pneumatic tire.

According to the invention, the provision of a pneumatically suspended wheel using the air pressure in the wheel tire comprises the following steps or a similar procedure.

In the arangements shown in Figures 1 and 2 there are used two circular continuous side plates $a$ and $b$ such that:—

(a) Each of them is provided at the peripheral portion thereof with a groove $c$ adapted to accommodate and maintain the flanges $d$ of the tire together with the flexible covering $e$ to be described later on.

(b) They carry rings $f$ rigid therewith which are to serve as seats for the connecting mechanism to be likewise described later on.

The side plates $a$ and $b$ constructed in that way will thus form at the periphery thereof a seat for both the pneumatic tire $g$ and the flexible covering $e$. An inner tube $h$ allows together with an inflation valve to raise the pressure of the fluid concealed in the toric volume delimited by tire $g$ and flexible cover $e$.

In the arrangement shown in Figs. 1 and 2 there is used also a side plate $i$ rigid with the wheel hub and such side plate $i$ comprises:—

A stamped out portion adapted to fit over the hub $j$ of the vehicle;

Apertures $k$ allowing the studs of hub $j$ to pass therethrough and allowing side plate $i$ to be secured upon hub $j$ by means of clamping nuts;

At the periphery thereof, apertures adapted to house the sockets $l$ of the connecting means.

In the arrangement shown in Figs. 1 and 2 there is also provided a connecting mechanism for the three side plates $a$, $b$, $i$ consisting in a plurality of tie-rods $m$ arranged parallel to one another and such that they comprise:—

At one end thereof a ball-like portion $n$ adapted to rotate within socket $l$;

At the other end, two flanged disks $o$ rigidly secured upon tie-rods $m$ by means of nuts $p$.

The last mentioned flanged disks are adapted to engage rings $f$ and prevent same from being drawn apart under the action of the pressure within the tire, which pressure is transmitted to members $f$ by the side plates $a$ and $b$. It is already easy to see that the connecting member $m$ is subjected:—

1. To stresses parallel with the axis thereof on account of the pressure within the tire (stresses upon the flange of parts $o$);

2. To stresses at right angles to the axis thereof on account of the weight of the vehicle (stresses upon balls $n$). Inasmuch as the sum of these various efforts is nil, it follows that the suspension of the vehicle is really taken care of by the pressure afforded by the tire.

As shown by the above description, the whole being suitably designed, assembled and fitted on the vehicle, such a wheel is obtained as will take care of the suspension of the vehicle by using only the air pressure in the pneumatic tire thereof; also such that when said wheel runs over a protuberance of the road same shall not skid, that is, shall not move laterally with respect to the ground, thus avoiding the abnormal wear consequent to skidding.

Figure 4 shows a wheel in the position where it runs over a protuberance the height of which is H, without any change in the height of the hub axis. As shown in Fig. 4, the tie-rods $m$ parallel with axis $q$—$q$ in Figs. 3 and 1 are tipped by rotation about balls $n$; the flanged disks $o$, $o$ instead of bearing in members $f$ with the whole periphery thereof as in Figs. 1 and 3 bear with but a portion of their toric surfaces and carry with them in their upward movement both side plates $a$, $b$; it must however be noted (Fig. 4) that the rise of $b$ is greater than that of $a$; it follows that the relative positions of both flanges of the tire are changed both in height and distance (which is another feature of the invention). It also follows that the center line $s$—$s$ of the ground-engaging section of the tire, which is normal to the ground in Fig. 3 has now become, in Fig. 4, $t$—$t$ which is no longer normal to the ground.

It further follows that in a well designed wheel the combined swinging action of tie-rods $m$, the variation in the relative positions of the tire flanges and the dipping of center line $t$—$t$ all result in the distance R remaining approximately constant. This shows, therefore, that the point of contact of the tire with the ground moves vertically, that is, without any sliding or skidding.

It is to be noted that the above result is arrived at through the relative displacements of the pneumatic tire flanges.

It is to be noted also that such movements due to rebound effects are avoided or notably reduced by the tendency of the tire to center itself with respect to the wheel hub. Finally it is to be noted that as the wheel which is the subject matter of the invention does not involve the use of any spring and as the elastic means is provided by a member (the tire) with which most wheels are already equipped, said wheels may be constructed so as to reduce to a minimum the weight of the unsuspended portion thereof.

Fig. 7 shows a connecting device similar to that of Figs. 1 and 4 but drawn on a larger scale.

Figs. 5 and 6 show a connecting device similar to that of Fig. 7 but in Fig. 5 for one of the flanged disks $o$ there is substituted a portion of a sphere $w$.

In Fig. 6 it has been supposed that the side plates $a$, $b$ (Fig. 1) are mounted crossways so that the stress set up by the tire results in a compression of member $x$ provided with a double toric flange.

Fig. 8 is a cross sectional view showing an inner flexible covering $e$ and a tire $g$ with the inner tube thereof.

This device is similar to, but drawn on a larger scale than that shown in Figs. 1 and 4; here, the flexible toric covering is maintained by means of two wire rings $z$.

Fig. 9 is a cross sectional view showing how the inner covering $y$ may be made integral with the tire $g$; the free edge of the flexible covering is secured by means of a circular flange.

As may be understood from the above, the invention is not limited to the embodiments shown; on the contrary, the same comprises all the modifications thereof that come within the scope of the appended claims.

I claim:

1. In a vehicle wheel, a pair of adjacent disks, each having a groove on the periphery thereof, a tire between said disks having portions cooperating with the said grooves, a disk adapted to be mounted on the vehicle hub, and flexible connecting means between the last mentioned disk and each of the first mentioned disks, said means having pivots in each of said disks.

2. In a vehicle wheel, a pair of disks, means for mounting a pneumatic tire on said disks, and means for flexibly mounting said disks on the vehicle hub, said last named means including tilting rods.

3. In a vehicle wheel, a pair of disks, a pneumatic tire mounted on said disks and having means tending to force said disks apart, a disk mounted on the vehicle hub, a series of rods connecting all of said disks and pivoted thereon, and means on said rods for restraining the pressure of the pneumatic tire against the aforementioned pair of disks.

4. In a vehicle wheel, a pair of disks, a pneumatic tire mounted on said disks, interlocking means between said disks and said tire, an internal flexible covering adapted to resist the air pressure in the tire, said covering being in contact with each of the disks, a third disk adapted to be mounted on the vehicle hub, and tilting means connecting all of said disks whereby the pneumatic tire may adjust itself to road obstructions with respect to the vehicle hub.

In testimony whereof I affix my signature.

FÉLIX TESSÉ.